United States Patent [19]
Warren, Jr. et al.

[11] Patent Number: 5,418,682
[45] Date of Patent: May 23, 1995

[54] CAPACITOR HAVING AN ELECTROLYTE CONTAINING A MIXTURE OF DINITRILES

[75] Inventors: Leslie F. Warren, Jr.; Henry O. Marcy, 5th, both of Camarillo

[73] Assignee: Rockwell International Corporation, Seal Beach, Calif.

[21] Appl. No.: 260,581

[22] Filed: Jun. 16, 1994

[51] Int. Cl.⁶ .................. H01G 9/038; H01G 9/035
[52] U.S. Cl. .................. 361/502; 361/504; 361/505; 252/62.2
[58] Field of Search .............. 361/502, 503, 504, 505; 252/62.2; 429/194

[56] References Cited

U.S. PATENT DOCUMENTS

| | | | |
|---|---|---|---|
| 3,648,126 | 3/1972 | Boos et al. | 361/502 |
| 4,377,623 | 3/1983 | Parker et al. | 429/15 |
| 4,544,615 | 10/1985 | Shishikura | 429/194 |
| 4,709,303 | 11/1987 | Fujiwara et al. | 361/502 |
| 4,710,310 | 12/1987 | Shinozaki et al. | 252/62.2 |
| 4,757,424 | 7/1988 | Morimato et al. | 361/502 |
| 4,762,634 | 8/1988 | Shinozaki et al. | 252/62.2 |
| 5,140,455 | 8/1992 | Varaprasad et al. | 359/275 |
| 5,145,609 | 9/1992 | Varaprasad et al. | 252/583 |
| 5,151,816 | 9/1992 | Varaprasad et al. | 359/275 |
| 5,260,855 | 11/1993 | Kaschmitter et al. | 361/502 |

FOREIGN PATENT DOCUMENTS

| | | | |
|---|---|---|---|
| 52-40025 | 10/1977 | Japan | 361/502 |
| 2-94510 | 4/1990 | Japan | 361/502 |
| 4-369817 | 12/1992 | Japan | 361/504 |

OTHER PUBLICATIONS

Mayer et al., "The Aerocapacitor: An Electrochemical Double-Layer Energy-Storage Device", J. Electrochemical Soc., vol. 140, No. 2, pp. 446–451, Feb. 1993.

Primary Examiner—Bruce A. Reynolds
Assistant Examiner—Gregory L. Mills
Attorney, Agent, or Firm—John C. McFarren

[57] ABSTRACT

An electrical capacitor includes an organic electrolyte to provide high power, high energy density, and broad operating temperature range. The capacitor includes electrodes and an electrolyte system comprising a salt combined with a solvent containing a nitrile. The electrolyte system is selected to be relatively nonreactive and difficult to oxidize or reduce so as to produce a high electric potential range. As examples, the electrolyte may include a solvent selected from the group consisting of acetonitrile, succinonitrile, glutaronitrile, propylene carbonate, and ethylene carbonate; a salt cation selected from the group consisting of tetraalkylammonium ($R_4N^+$) and alkali metals; and an anion selected from the group consisting of trifluoromethylsulfonate ($CF_3SO_3^-$), bistrifluoromethylsulfurylimide ($N(CF_3SO_2)_2^-$), tristrifluoromethylsulfurylcarbanion ($C(CF_3SO_2)_3^-$), tetrafluoroborate ($BF_4^-$), hexafluorophosphate ($PF_6^-$), hexafluoroarsenate ($AsF_6^-$), and perchlorate ($ClO_4^-$).

16 Claims, 1 Drawing Sheet

CAPACITOR HAVING AN ELECTROLYTE CONTAINING A MIXTURE OF DINITRILES

TECHNICAL FIELD

The present invention relates to high performance capacitors and, in particular, to electrolytic and electrochemical double layer capacitors having electrolytes containing a nitrile to provide high power, high energy density, and a broad operating temperature range.

BACKGROUND OF THE INVENTION

The basic components of electrical capacitors include conductive electrodes connected to an electric power supply and a dielectric material separating the electrodes. Electrolytic capacitors and electrochemical double layer capacitors also have an electrolyte. In an electrolytic capacitor, the dielectric is provided by an oxide layer formed on a metal foil and the electrolyte provides electrical contact to the opposite electrode. The inherently high resistance of electrolytic capacitors is generally mitigated by rolling a large sheet of the material into a roll. In an electrochemical double layer capacitor, the dielectric is provided by the electrolyte. In this type of capacitor, the resistance of the electrolyte is a significant factor in the total device resistance. In capacitors that use electrolytes, the electrolyte also has a major influence on the temperature performance of the capacitor.

Electrochemical double layer capacitors capable of high energy density, known as "supercapacitors," have been assembled from a variety of materials. In general, it is desirable to construct supercapacitors with lightweight materials and electrolytes that are stable and nonreactive, as described in U.S. Pat. No. 5,260,855 issued to Kaschmitter et al., the teachings of which are hereby incorporated by reference. This type of supercapacitor incorporates electrodes based on carbon foams that may be prepared from organic gels. Several types of foams can be produced, including aerogels, xerogels, and aerogel-xerogel hybrids. These low density carbon foams are electrically conductive, dimensionally stable, and machinable. Capacitors based on carbon foam electrodes are capable of delivering very high specific capacitance and very high power.

Electrochemical double layer capacitors, including supercapacitors, typically comprise electrodes, electrical contacts to a power supply, separators for electrodes and/or cells, an electrolyte, and environmental seals. As mentioned above, a key component of electrolytic and electrochemical double layer capacitors is the electrolyte, which typically comprises a combination of a salt and a solvent. Desirable electrolytes are typically liquid with low viscosity, low density, and high conductivity over a range of ambient temperature conditions. They should also be commercially inexpensive, chemically and electrochemically stable, and compatible with carbon. Aqueous electrolyte systems have been used extensively, but certain organic liquid systems are less prone to form gas and can be more effective in providing higher energy densities over a wider usable range of temperature and potential. A need exists for improved electrolyte systems that provide optimum capacitance for capacitors to achieve high power density, high energy density, a wide temperature range, and a long lifetime without memory effects.

SUMMARY OF THE INVENTION

The present invention comprises an electrical capacitor having a nonaqueous electrolyte that provides high power, high energy density, and a broad operating temperature range. The invention includes electrolytic and electrochemical double layer capacitors. Preferred embodiments of electrochemical double layer capacitors of the present invention incorporate carbon foam electrodes, as are known in the art. An electrolyte system is selected to be relatively nonreactive and difficult to oxidize or reduce so as to produce a high electric potential range. The electrolyte system of the present invention generally includes a solvent containing a nitrile (including dinitriles and mixtures thereof) that is liquid at room temperature and a salt, such as an organic tetraalkylammonium tetrafluoroborate, comprising ions that are not readily oxidized or reduced.

A principal object of the invention is an electrical capacitor having high power and high energy density. A feature of the invention is an electrolyte system including a nitrile or dinitrile solvent and a tetraalkylammonium salt. An advantage of the invention is an electrolyte system that provides a high dielectric constant, an increased range of operating temperatures, and an extended range of voltage stability in high power and high energy density electrical capacitors.

BRIEF DESCRIPTION OF THE DRAWINGS

For a more complete understanding of the present invention and for further advantages thereof, the following Detailed Description of the Preferred Embodiments makes reference to the accompanying Drawings, in which.

DETAILED DESCRIPTION OF THE PREFERRED EMBODIMENTS

Figure 1:
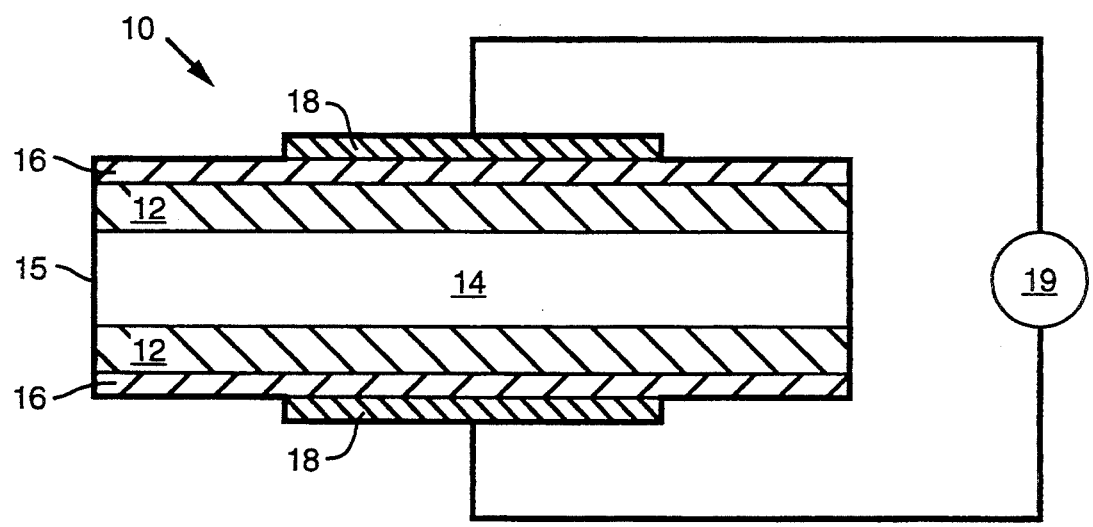
FIG. 1 is a schematic cross-section of an electrochemical double layer capacitor of the present invention.
Figure 2:
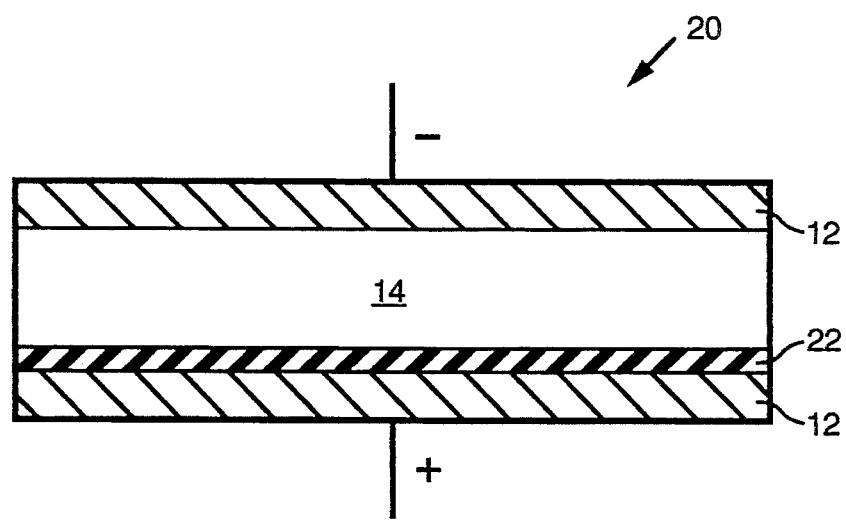
FIG. 2 is a schematic cross-section of an electrolytic capacitor of the present invention.

The present invention comprises an improved electrical capacitor capable of delivering very high specific capacitance and very high power over an operating temperature range of approximately $-60°$ C. to $150°$ C. A typical electrochemical double layer capacitor 10, as illustrated in FIG. 1, includes electrodes 12 separated by an electrolyte 14. Although capacitance is equal to $\epsilon A/d$ for parallel plate, electrolytic, and double layer capacitors, the interpretation of these terms is somewhat different for the various capacitors. In a parallel plate capacitor, $\epsilon$ is the dielectric constant of the dielectric between the two electrodes 12, A is the projected cross sectional area of electrodes 12 (which does not include surface roughness), and d is the distance between electrodes 12. In an electrochemical double layer capacitor, 8 is the dielectric constant of electrolyte 14, A is the internal surface area of the electrodes 12, and d is approximately equal to the Debye length (about 1–3 Å for concentrated solutions) over which the voltage drops inside the double layer. In an electrolytic capacitor 20, as illustrated in FIG. 2, $\epsilon$ is the dielectric constant of an oxide layer 22 on at least one of the electrodes 12 (typically on the anode foil in a polarized electrolytic capacitor), A is the surface area (typically of a rolled up foil), and d is the thickness of the oxide layer 22.

Capacitor 10 may include connector layers 16 between electrodes 12 and contacts 18 connected to a source 19 of electrical power. So-called supercapacitors, such as described in U.S. Pat. No. 5,260,855 issued to Kaschmitter et al., generally include carbon foam electrodes 12, electrical contacts 18 to power supply 19, an electrolyte 14, and cell separators and environmental seals 15. Some embodiments also include a porous electrode separator (such as fibrous glass, nylon fibers, or paper, for example) between electrodes 12 that functions as an ionically-conducting/electrically-insulating layer. Carbon foam electrodes 12 are generally prepared from organic gels such as aerogels, xerogels, and aerogel-xerogel hybrids. These low density carbon foams have the advantage of being machinable as well as electrically conductive and chemically and dimensionally stable. Alterative materials for electrodes 12 include carbon fibers, carbon composites (including metal filled composites), metals, and conductive metal oxides.

A key component of electrolytic and electrochemical double layer capacitors is the electrolyte 14, which generally comprises a combination of a salt and a solvent. An ideal electrolyte 14 is chemically and electrochemically stable, compatible with carbon, commercially inexpensive, and liquid with low density and relatively low viscosity in a range of ambient temperature conditions. Aqueous electrolyte systems are in widespread use, but certain organic liquid systems can be more effective in providing a greater usable range of electric potential, energy density, and operating temperature. The dielectric constant ($\epsilon$) of the solvent is also important in achieving optimum power and utilization of the capacitance because it affects both the double layer capacitance and the electrolytic conductivity. The improved capacitors of the present invention use organic electrolytes to provide optimum capacitance, high power density (on the order of ten kilowatts per kilogram), high energy density (on the order of ten watt-hours per kilogram, or ten watt-hours per liter), and long lifetime without memory effects.

Among organic electrochemical solvents, nitriles such as acetonitrile, or "ACN" ($CH_3CN$), are especially useful because they are generally nonreactive and difficult to oxidize or reduce electrochemically. Acetonitrile has one of the widest available ranges of electric potential of any organic solvent (in excess of 4 V with a platinum electrode and certain supporting electrolyte salts). In comparison, aqueous electrolyte systems have a thermodynamic breakdown voltage of only 1.23 V before hydrogen and oxygen evolution occur from the breakdown of water. When used alone, however, ACN lacks a high dielectric constant ($\epsilon = 37$) relative to water ($\epsilon = 80$), and it has a relatively high vapor pressure at room temperature (b.p. = 81° C.).

Other nitriles that might be considered for electrochemistry (such as the mononitriles propionitrile, phenylacetonitrile, isobutyronitrile, benzonitrile, and acrylonitrile, for example) generally have even lower dielectric constants and lower ranges of electric potential stability compared with ACN. Dinitrile systems, such as succinonitrile, or "SN" ($NCCH_2CH_2CN$), and glutaronitrile, or "GN" ($NCCH_2CH_2CH_2CN$), have high boiling points (i.e., greater than about 265° C.), but are less well known. SN has a relatively high dielectric constant in the liquid state ($\epsilon = 58$ at 56° C.), but it is a solid at room temperature (m.p. = 54°–56° C.). GN, however, is a liquid at room temperature (m.p. = −29° C.). Because of the extra $CH_2$ group in GN, the dielectric constant of GN ($\epsilon$ estimated to be about 40–50) is somewhat less than that of SN.

In the preferred embodiments of the present invention, the electrolyte solvents contain nitriles (including dinitriles, typically in mixtures such as 2:1 SN:GN (wt:wt), for example) that are liquid at room temperature and have relatively high dielectric constants ($\epsilon$). The accessible electric potential range of such mixtures (i.e., before solvent breakdown) is about 4 V as measured by cyclic voltammetry on a platinum electrode, which is approximately equal to that of ACN. A cyclic voltammogram of a nitrogen-purged ACN electrolyte containing approximately 0.1M $Et_4NBF_4$ with a platinum electrode exhibited breakdown currents at approximately −2.5 V and +2.5 V relative to a reference electrode ($Ag^0$/0.1M $AgNO_3$(ACN)). A corresponding system using 2:1 SN:GN (wt:wt) began breakdown at approximately −2.2 V and +2.2 V. Other solvents suitable for use as electrolytes in the present invention include dinitriles such as 2-methylglutaronitrile and 2-cyanoethyl ether and mixtures of nitriles and dinitriles. Embodiments of the invention may include various mixtures of the described electrolytes to cover a wide range of operating temperatures from about −60° C. to about 150° C.

The supporting salt in the electrolyte system of the present invention determines the usable electric potential range of the electrolyte. At the cathode, a metal cation can be reduced to metal which, in the case of alkali metal salts, can react irreversibly with the solvent. At the anode, the anion can be oxidized to radical species that can also attack the solvent. Among supporting electrolyte salts, the most electropositive cations (i.e., the most difficult to reduce) are the organic tetraalkylammonium systems (generically $R^1R^2R^3R^4N^+$, where each R represents an alkyl group that is the same as or different from any of the others (including $R_4N^+$, for example)). Nitrile soluble salts comprising cations of alkali metals, such as lithium ($Li^+$) and sodium ($Na^+$) for example, may also be useful in alternative embodiments of the invention. Among anions, trifluoromethylsulfonate ($CF_3SO_3^-$), bistrifluoromethylsulfurylimide ($N(CF_3SO_2)_2^-$), and tristrifluoromethylsulfurylcarbanion ($C(CF_3SO_2)_3^-$) are among the least susceptible to electrochemical oxidation. Other anions of this type include tetrafluoroborate ($BF_4^-$), hexafluorophosphate ($PF_6^-$), hexafluoroarsenate ($AsF_6^-$), and perchlorate ($ClO_4^-$). When using tetraalkylammonium tetrafluoroborate ($R_4N^+BF_4^-$) salts, for example, the highest conductivities are achieved with the smallest R groups; larger R groups tend to cause the salts to form ion pairs more readily in solution and thus lower the ionic conductivity. The member system having the smallest ions, tetramethylammonium tetrafluoroborate, has limited solubility. However, somewhat larger ion systems, such as $Me_3EtN^+$, $Me_3PrN^+$, $Me_3BuN^+$, and $Et_4N^+$ tetrafluoroborates (where Me=methyl; Et=ethyl; Pr=n-propyl; and Bu=n-butyl), exhibit considerably higher solubilities while retaining good solution conductivities. As an example, a sample comprising 2.13 g of $Me_3EtN^+BF_4^-$ dissolved in a mixture of 7.15 g SN and 3.58 g GN (approximately a 1M solution) had a measured conductivity value of $7.19 \times 10^{-3}$ Siemens. Additional salts suitable for the electrolytes of the present invention include $(Et_4N)PF_6$, $Li(CF_3SO_2)_2N$, and other salts of alkali metals with the anions described above. Various combinations of the aforementioned salts and solvents may be used to optimize the voltage, capacitance, temperature range, and resistance characteristics of the capacitor for different end use applications.

Preparation of Tetraalkylammonium Tetrafluoroborate Salts

As an example of a process for preparing tetraalkylammonium tetrafluoroborate salts, the following procedure was used to prepare trimethyl(n-butyl)ammonium tetrafluoroborate ($Me_3BuN^+BF_4^-$). Twenty grams of trimethylamine (from a 25% solution of trimethylamine in methanol) was refluxed with 32 g of 1-chlorobutane for two days. The mixture was evaporated to dryness at 80° C. to a yellowish oil containing some crystals (30.6 g total weight). This was dissolved in 125 ml of methanol, treated with 22.1 g of sodium tetrafluoroborate, warmed to about 55° C., and stirred overnight. The mixture was cooled in a refrigerator and filtered. The solid (primarily sodium chloride) was rinsed with acetone and the filtrates combined and evaporated to dryness at 55° C. The solid was dissolved in hot ethanol, filtered over charcoal, and the solution was allowed to evaporate. The white, crystalline salt, $Me_3BuN^+BF_4^-$, separated. The corresponding trimethyl(n-propyl)ammonium tetrafluoroborate salt, $Me_3PrN^+BF_4^-$, was prepared using the same process except for the substitution of 1-chloropropane in the initial reflux stage.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

We claim:

1. An electrical capacitor, comprising:
   a pair of electrodes separated by an electrolyte; and
   said electrolyte comprising a salt and a solvent containing succinonitrile mixed with a second dinitrile to form a liquid at room temperature.

2. The capacitor of claim 1, wherein said second dinitrile is selected from the group consisting of glutaronitrile, 2-methylglutaronitrile, and 2-cyanoethyl ether.

3. The capacitor of claim 1, wherein said salt includes a cation selected from the group consisting of tetraalkylammonium ($R^1R^2R^3R^4N^+$) and alkali metal ions.

4. The capacitor of claim 3, wherein said salt includes an anion selected from the group consisting of trifluoromethylsulfonate ($CF_3SO_3^-$), bistrifluoromethylsulfurylimide ($N(CF_3SO_2)_3^-$), tristrifluoromethylsulfurylcarbanion ($C(CF_3SO_2)_2^-$), tetrafluoroborate ($BF_4^-$), hexafluorophosphate ($PF_6^-$), hexafluoroarsenate ($AsF_6^-$), and perchlorate ($ClO_4^-$).

5. The capacitor of claim 3, wherein said cation is selected from the group consisting of trimethylethylammonium, trimethyl(n-propyl)ammonium, trimethyl(n-butyl)ammonium, tetraethylammonium, and tetraethylammonium.

6. The capacitor of claim 1, wherein the capacitor comprises an electrolytic capacitor having a metal oxide on at least one of said electrodes.

7. The capacitor of claim 1, wherein the capacitor comprises an electrochemical double layer capacitor and said electrodes comprise a material selected from the group consisting of carbon foams, carbon fibers, carbon composites, metal filled composites, metals, and conductive metal oxides.

8. An electrolytic capacitor, comprising:
   a pair of electrodes separated by an electrolyte;
   at least one of said electrodes having an oxide layer; and
   said electrolyte comprising a salt and a solvent containing succinonitrile mixed with a second dinitrile to form a liquid at room temperature.

9. The electrolytic capacitor of claim 8, wherein said second dinitrile is selected from the group consisting of glutaronitrile, 2-methylglutaronitrile, and 2-cyanoethyl ether.

10. The electrolytic capacitor of claim 8, wherein said salt includes a cation selected from the group consisting of tetraalkylammonium ($R^1R^2R^3R^4N^+$) and alkali metal ions.

11. The electrolytic capacitor of claim 10, wherein said salt includes an anion selected from the group consisting of trifluoromethylsulfonate ($CF_3SO_3^-$), bistrifluoromethylsulfurylimide ($N(CF_3SO_2)_2^-$), tristrifluoromethylsulfurylcarbanion ($C(CF_3SO_2)_3^-$), tetrafluoroborate ($BF_4^-$), hexafluorophosphate ($PF_6^-$), hexafluoroarsenate ($AsF_6^-$), and perchlorate ($ClO_4^-$).

12. The electrolytic capacitor of claim 10, wherein said cation is selected from the group consisting of trimethylethylammonium, trimethyl(n-propyl)ammonium, trimethyl(n-butyl)ammonium, tetraethylammonium, and tetraethylammonium.

13. An electrochemical double layer capacitor, comprising:
   a pair of electrodes separated by an organic electrolyte;
   said electrodes comprising a material selected from the group consisting of carbon foams, carbon fibers, carbon composites, metal filled composites, metals, and conductive metal oxides; and
   said electrolyte including a solvent containing succinonitrile mixed with a second dinitrile to form a liquid at room temperature and a salt comprising a cation and an anion.

14. The electrochemical double layer capacitor of claim 13, wherein said second dinitrile is selected from the group consisting of glutaronitrile, 2-methylglutaronitrile, and 2-cyanoethyl ether.

15. The electrochemical double layer capacitor of claim 13, wherein said salt comprises:
   said cation selected from the group consisting of tetraalkylammonium ($R^1R^2R^3R^4N^+$) and alkali metal ions; and
   said anion selected from the group consisting of trifluoromethylsulfonate ($CF_3SO_3^-$), bistrifluoromethylsulfurylimide ($N(CF_3SO_2)_2^-$), tristrifluoromethylsulfurylcarbanion ($C(CF_3SO_2)_3^-$), tetrafluoroborate ($BF_4^-$), hexafluorophosphate ($PF_6^-$), hexafluoroarsenate ($AsF_6^-$), and perchlorate ($ClO_4^-$).

16. The electrochemical double layer capacitor of claim 15, wherein said cation is selected from the group consisting of trimethylethylammonium, trimethyl(n-propyl)ammonium, trimethyl(n-butyl)ammonium, tetraethylammonium, and tetraethylammonium.

* * * * *